Figure 1:
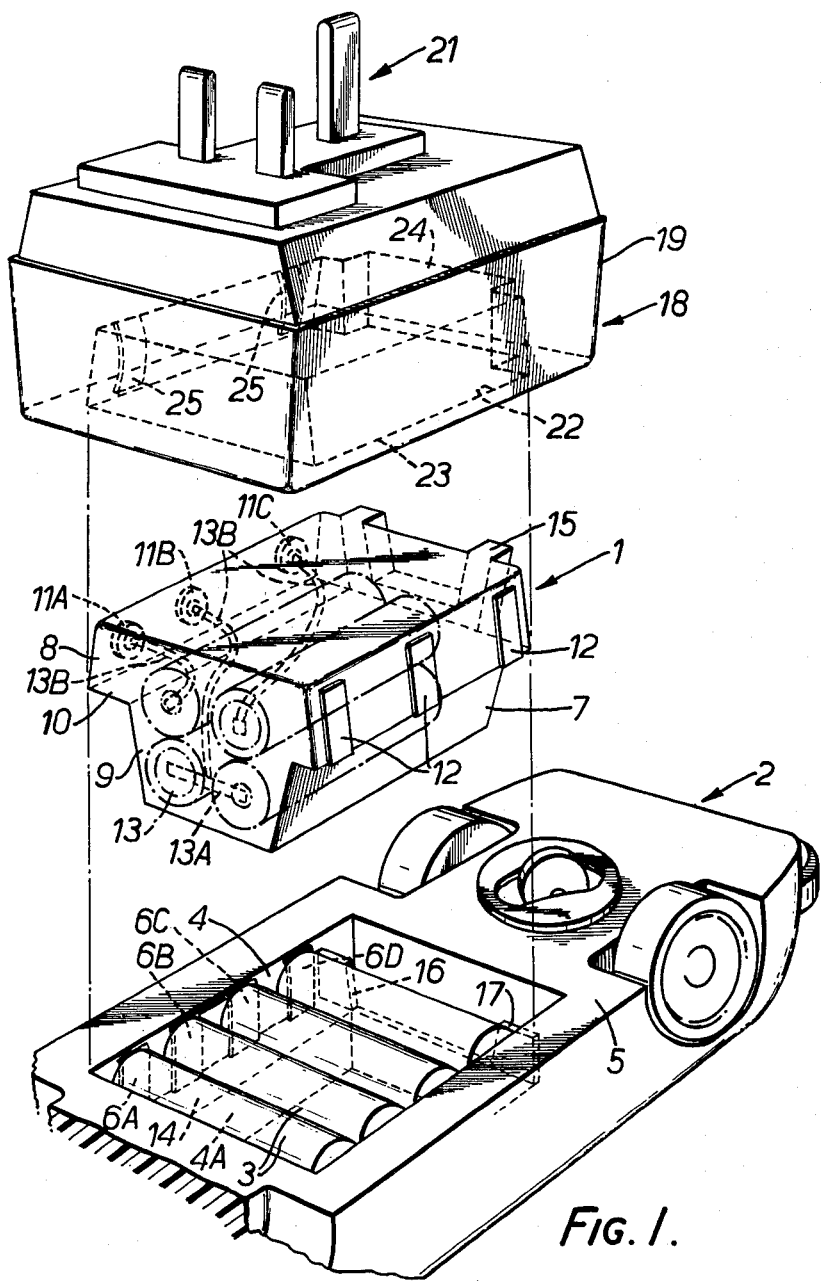

United States Patent [19]

Nicholls

[11] 4,389,469

[45] Jun. 21, 1983

[54] ELECTRICAL POWER PACKS AND CHARGING DEVICES

[75] Inventor: Bryan F. Nicholls, Kingsley, England

[73] Assignee: The Mettoy Company Limited, Northampton, England

[21] Appl. No.: 308,098

[22] Filed: Oct. 2, 1981

[30] Foreign Application Priority Data

Oct. 10, 1980 [GB] United Kingdom ............... 8032800
Jan. 9, 1981 [GB] United Kingdom ............... 8100682

[51] Int. Cl.$^3$ ........................................... H01M 2/10
[52] U.S. Cl. ..................................... 429/98; 429/99; 429/100
[58] Field of Search ................... 429/98, 99, 97, 100

[56] References Cited

U.S. PATENT DOCUMENTS

| | | | |
|---|---|---|---|
| 2,980,753 | 4/1961 | Nolter | 429/98 |
| 3,855,534 | 12/1974 | Holcomb et al. | 429/98 X |
| 3,881,961 | 5/1975 | Nation | 429/99 X |
| 3,992,225 | 11/1976 | Sykes | 429/99 X |
| 4,008,356 | 2/1977 | Asano | 429/98 |
| 4,123,598 | 10/1978 | Hammel | 429/99 X |
| 4,125,681 | 11/1978 | Sjogen | 429/99 |
| 4,227,140 | 10/1980 | Nardella et al. | 429/99 X |
| 4,230,777 | 10/1980 | Isalto | 429/98 X |

Primary Examiner—Charles F. LeFevour
Attorney, Agent, or Firm—Watson, Cole, Grindle & Watson

[57] ABSTRACT

A power pack (1) for use as an alternative to non-rechargeable batteries (3) in a toy (2) comprises a plurality of series connected rechargeable cells (13) accommodated within a casing (7) which is sealed permanently against removal of the cells and carries output terminals (11A–11C) arranged to cooperate with the power input terminals (6A–6D) of the toy when the power pack is inserted in place of the cells and with the contact terminals (25) of a recharging device (18) when the power pack is engaged with this device for recharging the cells. The power pack casing is shaped to cooperate with the toy (2) and recharging device so that it will engage with each in only one predetermined position.

16 Claims, 2 Drawing Figures

ELECTRICAL POWER PACKS AND CHARGING DEVICES

This invention relates to rechargeable electrical power packs and to electrical charging devices for use therewith.

Many toys, such as toy cars and electronic games, are now available which are operated using cells or batteries as a power source. Commonly used batteries are of the non-rechargeable dry cell type which have to be thrown away when they reach the end of their useful life and the power output drops below an acceptable level. They then have to be replaced by fresh battery. The life of the battery is very short if the on-off switch of the toy is left on for a considerable length of time, the battery power dissipating for that time. The cost of continual replacement of batteries can be substantial.

In order to reduce the long-term cost of battery replacement, rechargeable batteries are available which, when the power output drops, can be recharged using a charging device. Commonly, such a battery may accept 500 to 1000 charges during its life. The rechargeable cells are made in sizes the same as the non-chargeable ones so that they can be interchanged in the toys.

Typical charging devices for rechargeable batteries are available and comprise a transformer and rectifier which has an A.C. voltage input and an output which depends on the batteries to be charged. Such devices have one or more pairs of terminals between which respective batteries are located, the charging power being transmitted from one terminal, through a battery to another terminal.

One problem with such devices is that the individual cells must be correctly orientated and usually the device is marked with an indication of which way around the cells should be positioned. A more serious problem, however, is that the devices will accept non-rechargeable cells. If a child were to insert non-rechargeable batteries into such a device, it is possible that the contents would leak, causing damage to the device and possible injury to the child, or, more seriously, the cells could explode spilling its caustic contents and causing serious damage, or injury to the child.

Because of these risks, charging devices are not normally sold with toys as part of the toy, but are sold separately for purchase by adults who are supposed to properly supervise their children. Of course, adults do not themselves always appreciate the problems and dangers and they may allow children to use the devices without proper supervision, with possibly disastrous consequences.

The aim of the present invention is to overcome the above-mentioned problems.

In accordance with the invention there is provided a power pack for an electrically operated device, comprising a casing, one or more rechargeable cells received within the casing, power output terminals carried by the casing for cooperation with the electrical power input terminals of the device to be operated, and means within the casing connecting the battery terminals electrically to the output terminals, the casing being sealed permanently against removal of the cells and having an asymmetric configuration to permit engagement of the power pack with the device to be powered thereby, and with a battery recharging device therefor, in a single position defined uniquely with respect to each said device.

The asymmetry or irregular profile of the casing may be defined by a projection or recess arranged to key with complementary means on the device to be powered or the recharging device, and in a preferred construction comprises an integral projection at one end of the power pack casing.

The power pack may be provided in combination with a battery operated device, such as a toy, this device comprising a recess and pairs of opposed electrical input terminals located on opposite sides of the recess for receiving cells therebetween, the recess having a complementary shape to the power pack casing to receive the power pack in one predetermined position, the output terminals of the power pack being positioned on the casing to engage selected input terminals of the device when the power pack is received in the recess.

With such a combination it is impossible for even a child to insert the power pack incorrectly into the toy.

The dimensions of the power pack are such that the width of that part which fits between the terminals in the recess of the toy is substantially the same as the length of the cells or batteries which it is intended to replace.

The power pack will normally be sold in combination with a charging device, the device comprising a housing, a recess in the housing of complementary shape to a part of the power pack casing to receive said casing part in one predetermined position, the output terminals being located on said one casing part, and two electrical terminals positioned in the recess to contact respective output terminals of the power pack for supplying electric current to recharge the cells of the power pack when the power pack is engaged in the recess of the recharging device, and said contact terminals being so positioned with respect to each other that non-rechargeable cells cannot directly connect said terminals.

In such a combination any danger arising through attempts to recharge non-rechargeable batteries is positively eliminated since the batteries are sealed permanently in the casing and the recharging device will not accept non-rechargeable batteries between its terminals.

Preferably, the terminals on the power pack are on the same side thereof for engagement respectively with positive and negative terminals in both the toy and the charging device. A further, intermediate terminal may be provided which is a terminal for a take-off voltage intermediate the positive and negative terminals. The take-off terminal is engageable with a corresponding terminal in the toy, for example in a toy vehicle where one half battery power is used for forward motion and one half for rearward motion.

The major expense in the manufacture of the power pack is the cost of the rechargeable batteries which can be ruined if short circuited. Furthermore, although it is remote, there is a possibility that the rechargeable cells could, if short circuited, generate sufficient current to cause a fire. It is preferred, therefore, to include a fuse in the electrical circuit in the power pack.

A disadvantage in using a conventional fuse is that it is fairly expensive and also needs to be accessible for replacement.

In a preferred power pack according to the invention the battery and output terminals are connected via a printed circuit board which includes at least one conductive track having a first part connected to a battery terminal, a second part connected to an output terminal, and a part intermediate said first and second parts and of reduced width to constitute the fuse. The reduced width portion is provided most conveniently by forming to specified dimensions a part of one or more of the conductive tracks printed on a substrate. The dimensions of the part of the track are determined by the current level at which the fuse is desired to "blow". Normally, the thickness of the track will be constant and the width of the track altered to the extent necessary for the portion of the track to constitute a fuse. This allows the fuse to be formed at the same time as the rest of the circuit board.

Figure 2:
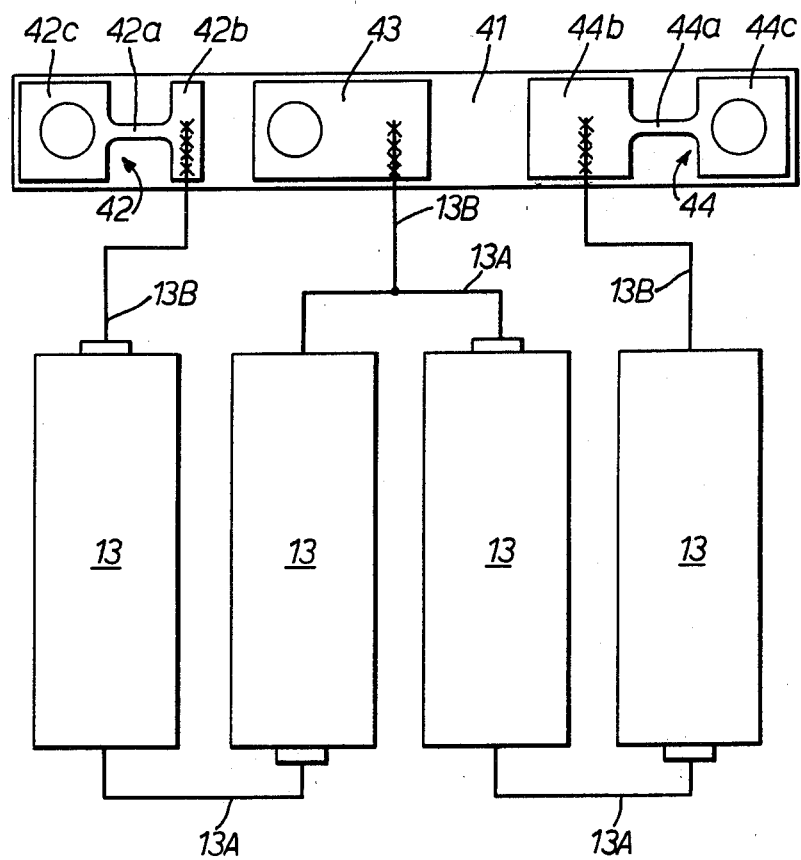

A better understanding of the invention will be had from the following detailed description which is given by way of example with reference to the accompanying drawings in which:

FIG. 1 is an exploded perspective view of a power pack embodying the invention in combination with a charging device and a toy vehicle with which it is adapted to cooperate; and FIG. 2 is a schematic representation showing the batteries connected to terminals carried by a printed circuit board in a modified power pack according to the invention.

The power pack 1 shown in FIG. 1 is designed for use with the toy vehicle 2 which normally runs off four batteries 3, which may be rechargeable or non-rechargeable. The batteries 3 are normally arranged in series in a recess 4 in the vehicle base 5 and engage at their ends spring terminals 6A, 6B . . . only four of which are shown. The orientation of the batteries is important since the vehicle will not operate if they are wrongly inserted. To ensure proper orientation it is usual for markings to be made on the toy illustrating how the batteries should be inserted, but it is possible for people to insert the batteries wrongly, and it is not unknown for toys to be returned to the retailer as not working, when the only fault is the improper orientation of the batteries.

The power pack 1 which cannot be wrongly inserted into the toy vehicle, comprises a casing 7 having portions 8, 9 separated by shoulders 10. As may be seen in FIG. 1 the shoulder at one side of the casing is wider than that at the other side so that the portion 9 is positioned asymmetrically with respect to the portion 8. The portion 8 is of generally rectangular configuration and has three terminals 11A, 11B, 11C spaced apart along one side thereof, and respective projections 12 on the opposite side. The distance between the terminals 11A-C and the respective projections 12 is substantially equal to the length of the cells 3 to be replaced. Conveniently, the portion 9 of the casing 7 has a slightly trapezoidal cross-section and receives four rechargeable cells 13 of at least equal power and size similar to the cells 3, the cells 13 being arranged with their axes extending longitudinally of the casing 7 so that they lie perpendicular to the axes of cells 3 when the power pack is fitted into the vehicle. The cells 13 are connected electrically in series by conductive link bars 13A and wire conductors 13B within the casing 7 connect the positive and negative terminals of the series connected cells 13 to the positive and negative terminals 11A, 11C of the power pack, respectively, and connect an intermediate output terminal 11B to one of the link bars 13A. The terminal 11C is commonly used in toy vehicles so that one half the battery power, the power of two cells in this case, is used for forward drive and one half for reverse drive and/or ancillary equipment. For convenience the cells can be held together by a heat shrunk plastics sleeve which may be of added advantage if the outer casing is perforated, in providing insulation for the cell terminals.

It is to be noted that the casing is permanently sealed against removal of the cells to deter any attempt to replace the rechargeable cells with non-rechargeable ones. This has the added advantage of preventing the cells from being removed and then being reinserted wrongly.

When the power pack is inserted in the vehicle, casing portion 9 seats in a complementarily shaped part 4A of the vehicle battery-receiving recess 4 and shoulders 10 rest on shoulders 14 of the recess 4. In order to ensure that the pack 1 can be inserted in only one, uniquely defined position, the casing 7 has an end projection 15 which seats in a complementary shaped cutout 16 in a wall 17 of the vehicle recess 4. The pack 1 is usually held in place by a cover (not shown) which clips over the recess 4 in known manner.

Thus, when inserted, the pack 1 supplies power to the vehicle through the contact of terminals 11A with 6A, 11B with 6B or 6C (terminals 6B and 6C being interconnected), and 11C with 6D. Furthermore, there is no possibility of the pack being wrongly inserted. If the pack is removed, for example for recharging, it can be replaced by the conventional cells 3 arranged as To permit recharging of the power pack there is provided a charging device 18 comprising a housing 19 which may contain a transformer and rectifier (not shown) and carry plug connections 21 for connection with a household mains socket. Although a 13 Amp British Standard Connector is shown in FIG. 1 other connections could obviously be used. Furthermore, the charging device itself need not necessarily include the transformer, rectifier and plug contacts 21, and it may instead be equipped with a socket or other form of connection to which a DC voltage of the required magnitude is supplied.

In one face the housing 19 of the device 18 has a recess 22 with a main part 23 of shape complementary to the shape of portion 8 of the power pack 1, and a further rectangular part 24 adapted to receive the projection 15 of the power pack 1. Thus, the power pack can be fitted into the recess 22 in one uniquely defined position determined by the asymmetric shaping of the power pack casing and the recess 22 of the charging device.

On one side of the recess 22 are two terminals 25 which are positioned to contact terminals 11A, 11C of the power pack 1 when the pack is inserted in the charging device 18. The terminals 25 are the output terminals of the transformer and rectifier circuit of the recharging apparatus.

It will be seen that it is not possible for even a child to insert the pack incorrectly into the device 18. Furthermore, the two terminals 25 are so arranged that conventional cells cannot be placed in electrical charging contact with them. Thus, a non-rechargeable battery 3 could not be placed in the device and there is therefore no possibility of damage or injury being caused by an attempt to recharging a non-rechargeable cell or cells.

It will be appreciated that while it is preferable to have a standard shape of pack for use with all toys, various shapes could be used. In particular, means of properly locating the pack different from the projection could be used. For example, the vehicle and charging device could have a projection cooperating with a recess on the pack. Furthermore, the projection could have any suitable shape.

The pack may accommodate any number or size of cells, depending upon its application. The location of the terminals 11A-C could also be different, as could the location of the terminals of the charging device. For example, they could be located on opposite sides of the recess, provided that a standard cell could not be placed in electrical contact with both of them.

The position of the centre of gravity and the shape of the pack is preferably such that the pack cannot be placed on its side, with the terminals contacting a metal surface or object, since it is not stable in that position. The terminals 11A-C can be recessed to reduce the risk of accidental short circuiting. The rechargeable cells are expensive and they can be ruined if the power pack terminals are short circuited. To prevent the batteries being ruined in this way a fuse may be included in the power pack and be arranged to blow if the terminals are shorted.

A novel form of fuse suitable for use in the power pack of the present invention is illustrated in FIG. 2 which shows the rechargeable cells 13 of the power pack connected in series by link bars 13A. The cells 13 are connected to the exterior output terminals of the power pack by means of conductor leads 13B and a printed circuit board 41. The board 41 is made of a fire resistant material or combination of materials such as a fibre glass based copper laminate board or a phenolic cellulose paper laminate and is provided with printed contact portions 42, 43 and 44. The contact portions 42 and 44 are specially formed to provide fusible portions 42a and 44a, respectively, between a portion 42b, 44b to which a pole of a cell is connected by a lead 13A and a portion 42c, 44c to which the terminal is attached. It is not necessary to provide the contact 43 with a fusible portion since if short circuit conditions exist between contact portions 42c and 43, or 43 and 44c, or 44c and 42c one or other or both of the fusible sections will fuse and disconnect the cells from the exterior terminals.

We have found an arrangement as shown in FIG. 1 will be able to withstand excess currents of 2 to 3 times the normal current but will blow instantaneously if the power pack terminals are short circuited so that the expensive cells are undamaged. If one of the fuses blows the unit is worth returning to the manufacturer as the cells, which constitute the major expense in the total cost of the power pack can be re-claimed by fitting a new circuit board and housing at relatively low cost.

The terminals may take the form of hollow pins which pass through holes in the circuit board and are soldered to the contact portions 42c, 43 and 44c, these pins projecting through openings defined in the power pack casing.

What I claim is:

1. A power pack in combination with a battery operated device, the power pack comprising a casing, means for receiving rechargeable cells within the casing, power output terminals carried by the casing, and conductor means within the casing connecting the rechargeable cell terminals electrically to said output terminals, the casing being sealed permanently against removal of the rechargeable cells, said battery operated device comprising a base member including a recess having opposite sides, and pairs of opposed electrical power input terminals located on said opposite sides of the recess adapted for receiving individual conventional battery cells therebetween, the recess and power pack casing including complementary keying means for said recess to receive the power pack in place of said individual conventional battery cells in one predetermined orientation of said power pack relative to said recess, and said output terminals of the power pack engaging predetermined input terminals of the battery operated device with the power pack in the recess.

2. The combination of claim 1, wherein the rechargeable cells extend parallel with said opposite sides of the recess in the battery operated device with the power pack received therein, the casing having a part which is accommodated between the input terminals on opposite sides of said recess and has a width substantially equal to the length of the conventional cells which are replaceable by the power pack.

3. The combination of claim 1, wherein the output terminals of the power pack are located on one side only of the casing.

4. The combination of claim 1, wherein the power pack casing includes a first portion of substantially rectangular configuration, a second portion of smaller width than the first portion, a pair of shoulders of unequal width on opposite sides of the second portion and separating said first and second portions, and a projection extending beyond one end of the first portion and of less width than said first portion, said output terminals being positioned on said first portion.

5. The combination of claim 1, wherein a plurality of rechargeable cells are received in the power pack causing, and further comprising link means for connecting the cells electrically in series, the terminals of the cells not connected by the link means being connected to positive and negative output terminals of the power pack, and a third output terminal connected to the cells at an intermediate tapping point defined by one of said link means.

6. The combination of claim 1, wherein the conductor means connecting the cell terminals with the output terminals includes a fuse.

7. The combination of claim 6, wherein the conductor means connecting the cell terminals with the output terminals includes a printed circuit board and the fuse is integral with the printed circuit board.

8. The combination of claim 7, wherein the printed circuit board includes at least one conductive track having a first part connected to a cell terminal, a second part connected to an output terminal, and a part intermediate said first and second parts and of reduced width to constitute the fuse.

9. A power pack for an electrically operated device having power input terminals, in combination with a recharging device, the power pack comprising a casing, means for receiving rechargeable cells within the casing, power output terminals carried by the casing for cooperation with the electrical power input terminals of the device to be operated, and conductor means within the casing connecting the rechargeable cell terminals electrically to said output terminals, the casing being sealed permanently against removal of the rechargeable cells, the recharging device comprising a housing with a recess therein, and two electrical recharging terminals in said recess, the housing recess and power pack casing having complementary keying means for said recess to receive said casing in one predetermined position, said two electrical recharging terminals being positioned in the housing recess to contact respective output terminals of the power pack for supplying electric current to recharge the cells of the power pack with the power pack engaged in the recess of the recharging device, and said two electrical recharging terminals being so positioned with respect to each other that conventional non-rechargeable cells cannot directly interconnect said terminals.

10. The combination of claim 9, wherein the output terminals of the power pack are located on one side only of the casing.

11. The combination of claim 9, wherein the power pack casing includes a first portion of substantially rectangular configuration, a second portion of smaller width than the first portion, a pair of shoulders of unequal width on opposite sides of the second portion and separating said first and second portions, and a projection extending beyond one end of the first portion and of less width than said first portion, said output terminals being positioned on said first portion.

12. The combination of claim 9, wherein a plurality of rechargeable cells are received in the power pack casing, and further comprising link means for connecting the cells electrically in series, the terminals of the cells not connected by the link means being connected to positive and negative output terminals of the power pack, and a third output terminal connected to the cells at an intermediate tapping point defined by one of said link means.

13. The combination of claim 9, wherein the conductor means connecting the cell terminals with the output terminals includes a fuse.

14. The combination of claim 13, wherein the conductor means connecting the cell terminals with the output terminals includes a printed circuit board and the fuse is integral with the printed circuit board.

15. The combination of claim 14, wherein the printed circuit board includes at least one conductive track having a first part connected to a cell terminal, a second part connected to an output terminal, and a part intermediate said first and second parts and of reduced width to constitute the fuse.

16. A power pack adapted for use alternatively with a battery operated device and a recharging device, the power pack comprising a casing, rechargeable cells received within the casing, power output terminals carried by the casing, and conductor means within the casing connecting the cell terminals electrically to said output terminals, the casing being sealed permanently against removal of the cells, said battery operated device comprising means defining a first recess having opposite sides, and pairs of opposed electrical power input terminals located on said opposite sides for receiving individual conventional cells therebetween, said first recess and power pack casing including complementary keying means for said first recess to receive the power pack in place of said conventional cells in one predetermined orientation only of said power pack relative to said first recess, said output terminals engaging predetermined input terminals of the battery operated device with the power pack received in said first recess, the recharging device comprising a housing with a second recess therein, and two electrical recharging terminals in said second recess, said second recess and power pack causing having complementary keying means for said second recess to receive said casing in one predetermined position, said two recharging terminals being positioned in said second recess to contact respective output terminals of the power pack for supplying electric current to recharge the cells of the power pack with the power pack engaged in said first recess of the recharging device, and said two recharging terminals being so positioned with respect to each other than conventional non-rechargeable cells cannot directly interconnect said terminals.

* * * * *